(12) United States Patent
Duelli

(10) Patent No.: US 9,383,037 B2
(45) Date of Patent: Jul. 5, 2016

(54) DEVICE FOR CLOSING AN OPENING IN A CHAMBER WALL

(75) Inventor: Bernhard Duelli, Ubersaxen (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 13/574,822

(22) PCT Filed: Nov. 17, 2010

(86) PCT No.: PCT/AT2010/000445
§ 371 (c)(1),
(2), (4) Date: Jul. 24, 2012

(87) PCT Pub. No.: WO2011/091451
PCT Pub. Date: Aug. 4, 2011

(65) Prior Publication Data
US 2012/0317887 A1   Dec. 20, 2012

(30) Foreign Application Priority Data

Jan. 28, 2010 (AT) .................................. A 110/2010

(51) Int. Cl.
| B65D 45/00 | (2006.01) |
| F16K 51/02 | (2006.01) |
| F16J 15/46 | (2006.01) |
| F16K 3/02 | (2006.01) |
| F16K 3/18 | (2006.01) |

(52) U.S. Cl.
CPC .................. *F16K 51/02* (2013.01); *F16J 15/46* (2013.01); *F16K 3/0227* (2013.01); *F16K 3/188* (2013.01); *H01J 2237/186* (2013.01)

(58) Field of Classification Search
CPC .. B60J 10/0042; B60J 10/0037; E06B 7/2318

USPC ............................ 220/812; 49/477.1; 251/158
See application file for complete search history.

(56) References Cited

U.S. PATENT DOCUMENTS

| 3,178,779 | A |   | 4/1965 | Clark et al. |
| 4,080,526 | A |   | 3/1978 | Kihara et al. |
| 4,109,922 | A |   | 8/1978 | Martin |
| 4,624,465 | A |   | 11/1986 | Rogemont |
| 5,361,542 | A | * | 11/1994 | Dettloff ........................ 49/477.1 |
| 5,379,983 | A | * | 1/1995 | Geiser ........................... 251/167 |

(Continued)

FOREIGN PATENT DOCUMENTS

| CN | 2130963 | 4/1993 |
| EP | 0179722 | 8/1985 |
| GB | 1530977 | 11/1978 |

(Continued)

*Primary Examiner* — Jeffrey Allen
(74) *Attorney, Agent, or Firm* — Volpe and Koenig, P.C.

(57) ABSTRACT

Device for closing an opening in a chamber wall of a low-pressure or vacuum chamber, having at least one movably mounted closure element, a main body with a through-opening and a seat, which surrounds the through-opening, the through-opening is congruent with the opening in the chamber wall, and the device has at least one open position of the closure element, in which the through-opening is exposed by the closure element, and at least one closed position, in which the through-opening is completely closed using the closure element. At least one elastic seal with an inflatable chamber is sealingly arranged in the closed position between the closure element and the seat and the elastic seal has in addition to the inflatable chamber a safety chamber for receiving fluid from the inflatable chamber in the event of a leak in the inflatable chamber.

13 Claims, 7 Drawing Sheets

(56) References Cited

U.S. PATENT DOCUMENTS

| 5,772,950 A | 6/1998 | Brustad et al. |
| 7,422,653 B2 | 9/2008 | Blahnik et al. |
| 2004/0123916 A1 | 7/2004 | Chen |

FOREIGN PATENT DOCUMENTS

| JP | H05215249 | 8/1993 |
| JP | 2004360754 | 12/2004 |
| WO | 9606725 | 3/1996 |

* cited by examiner

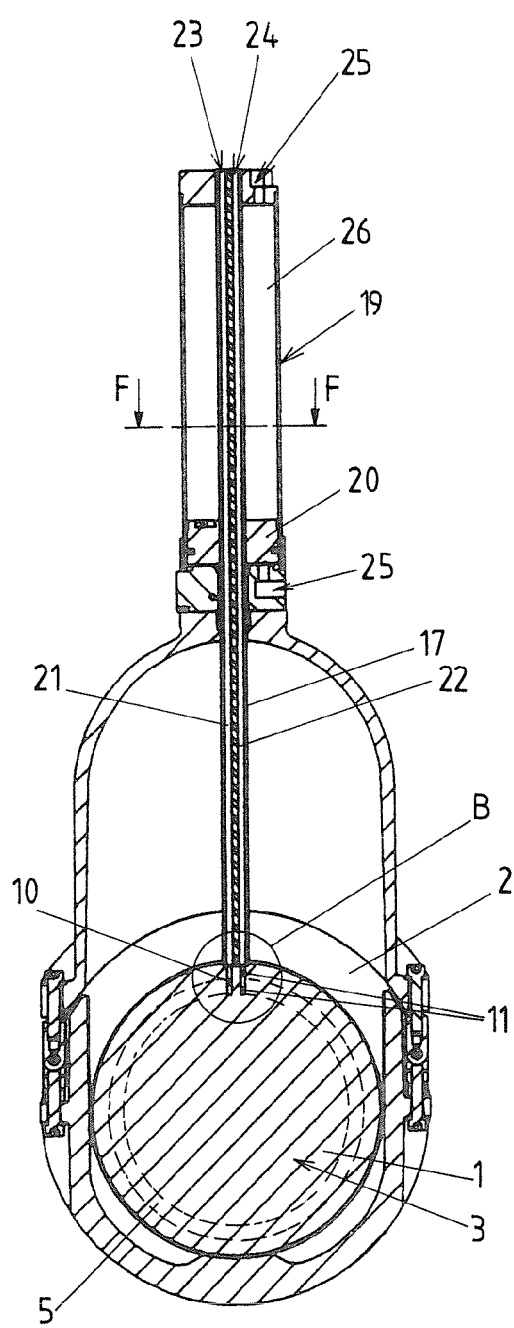
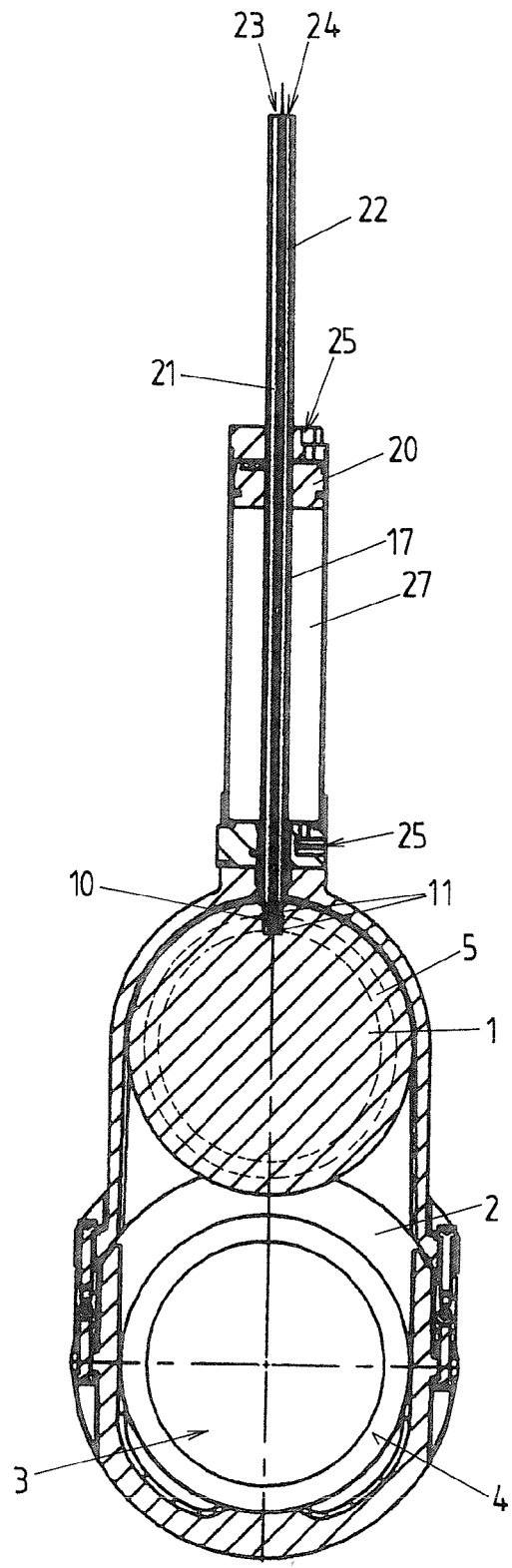

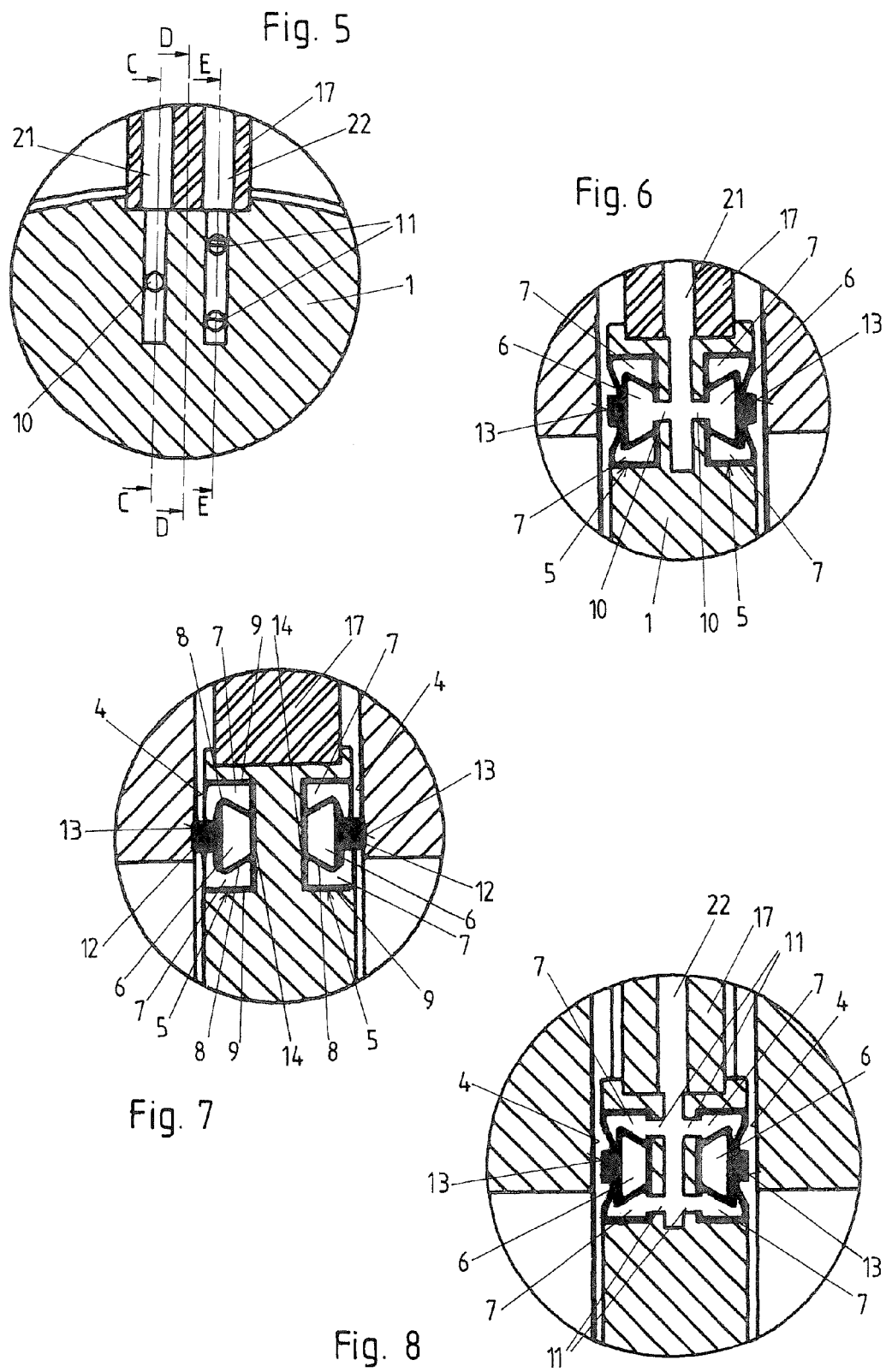

DEVICE FOR CLOSING AN OPENING IN A CHAMBER WALL

BACKGROUND

The present invention relates to a device for closing an opening in a chamber wall of a low-pressure chamber or a vacuum chamber comprising:

at least one movably supported closure element and at least one main body with a through-opening and at least one seat, which surrounds the through-opening, with the through-opening can be made congruent or is congruent with the opening in the chamber wall, and at least one open position of the closure element, in which the through-opening is released by the closure element, and at least one closed position of the closure element, in which the through-opening is completely closed by the use of the closure element, and at least one elastic seal with at least one inflatable chamber, with the seal in the closed position being arranged between the closure element and the seat and the closure element seals against the seat.

Low-pressure and/or vacuum chambers are frequently used in prior art to perform production or processing steps under low-pressure and/or vacuum. In order to allow inserting the work pieces to be processed into the low-pressure chamber and/or vacuum chamber openings are required in the chamber wall, which after inserting the object to be processed can be closed again, before the low-pressure and/or the vacuum is generated in the low-pressure and/or vacuum chamber. Generic devices serve to appropriately close these openings in the chamber wall of the low-pressure and/or vacuum chamber. Of course, these devices are embodied such that the object to be processed in the open state of the closure element not only can be inserted into the low-pressure and/or vacuum chamber but can also be removed therefrom. Generic devices may be produced as separate parts and fastened appropriately at the chamber wall. However, it is also possible to integrate the elements and/or their main body directly in the chamber wall. By fastening as well as by integration of the elements at or in the chamber wall, in any case the through-opening of the device is made congruent with the opening in the chamber wall, so that the work pieces to be processed can be guided through the through-opening into the device and the opening in the chamber wall when the closure element is in the opened position. In the closed position of the closure element the through-opening and thus also the opening in the chamber wall are completely closed. Closure elements of this type are available in very many different embodiments. Generic installations of this type provide at least one elastic seal, which exhibits an inflatable chamber, with the seal in the closed state being arranged between the closure element and the seat and seals the closure element to the seat. These so-called inflatable seals are advantageous such that they can compensate uneven sections in the seat to which they are pressed. Further, they allow the omission of any additional movement of the closure element in the direction towards the seat and in the direction away from the seat and this way permit a mechanically easier design of generic elements.

In prior art, various inflatable seals are known in the context with low-pressure and/or vacuum chambers. For example, it is known from U.S. Pat. No. 5,772,950 A to fasten the lid of a vacuum chamber via an inflatable seal to the remaining chamber wall of the vacuum chamber. US 2004/0123916 A1 as well as GB 1530977 A show similar installations. A device for electron-beam processing is known from U.S. Pat. No. 4,080,526 A in which also inflatable seals are used to seal a vacuum chamber.

One disadvantage of the inflatable seals lies in the fact that particularly by aging processes and the like the wall of the inflatable chamber in the seal can break, by which the leak developing here allows the fluids used for inflating the seal to penetrate during the processing step into the low-pressure chamber and/or the vacuum chamber. This leads generally not only to a disturbance of the process occurring in the low-pressure and/or vacuum chamber but, due to the high pressure differences, usually the object to be processed is destroyed or perhaps also the low-pressure and/or vacuum chamber itself is compromised and/or destroyed.

SUMMARY

The objective of the invention is to provide a generic device such that in case of a leak in the inflatable chamber no fluid present in the inflatable chamber can flow out under pressure into the low-pressure and/or vacuum chamber.

This is achieved according to the invention in that the elastic seal, in addition to having the inflatable chamber, comprises at least one safety chamber to accept a fluid from the inflatable chamber in case of a leak in said inflatable chamber.

One underlying idea of the invention therefore comprises to provide at least one additional chamber in the seal itself, namely the safety chamber, which in case of a leak in the wall of the inflatable chamber can accept the fluids flowing out of the inflatable chamber so that they cannot flow into the low-pressure and/or vacuum chamber. According to this idea therefore at least one safety chamber is directly integrated in the elastic seal. Beneficially here at least one safety chamber is arranged adjacent to the inflatable chamber. In the embodiment of the invention it may be provided that the inflatable chamber is separated from at least one safety chamber by at least one intermediate wall of the seal. Particularly preferred embodiments provide here for a predetermined breaking point in the intermediate wall between the inflatable chamber and the safety chamber. This predetermined breaking point may beneficially be embodied such that when a leak occurs in the inflatable chamber it occurs at said predetermined breaking point. The term of the predetermined breaking point is here not to be understood such that in normal operation a break shall occur but that, in the unlikely event of any break occurring, it develops at least at a defined position, namely the predetermined breaking point. This represents a point embodied weaker in a targeted fashion, in order to promote any break that occurs to occur here, if such an undesired event happens. This may be achieved, e.g., by the inflatable chamber being surrounded by the intermediate wall and by other walls of the seal and the intermediate wall being embodied at least sectionally weaker and/or thinner than the other walls. At least one safety chamber may here be limited by the intermediate wall and a lateral exterior wall of the seal.

Elastic seals according to the invention comprise at least one safety chamber, as already stated. Particularly preferred embodiments provide that two or more safety chambers are integrated in the elastic seal. Here, it is particularly beneficial for the inflatable chamber to be surrounded at least at two opposite sides by respectively one safety chamber. A symmetric embodiment of the safety chambers around the inflatable chamber is also beneficial in the sense of a most symmetrical extension of the inflatable seal during inflation of said inflatable chamber. It is also possible to arrange the inflatable chamber entirely inside the hollow chamber in a safety chamber. Therefore, it may be provided that the intermediate wall between the inflatable chamber and the safety chamber completely surrounds the inflatable chamber and/or the hollow space of the inflatable chamber. For example, the inflatable chamber is surrounded by a tubularly embodied intermediate wall and arranged in a hollow space of the safety chamber.

Within the scope of the previous and the following explanations, here for reasons of simplification, generally only at least one safety chamber is being discussed. This shall be understood such that here all cases are included in which only one or also two or even more safety chambers are present in the elastic seal.

For reasons of clarification it is also pointed out that "inflatable" generally represents any form of an expandable chamber. The inflating can here occur pneumatically, thus by introducing compressed gas and/or gas mixtures, such as air, or hydraulically by the introduction of pressurized liquids and/or pressurized liquid mixtures. Of course, the gases or liquids introduced into the inflatable chamber under pressure may also be drained again before the closure element is moved into an open position. In general, devices according to the invention comprise several opened positions and/or intermediate positions. However, there is always one maximally opened positioned. This is only achieved in preferred embodiments when the through-opening is completely open. This is achieved when the closure element is moved into a position in which it is not any longer congruent at all with the through-opening. In this position it is ensured that the entire cross-section of the through-opening is available in order to introduce work pieces to be processed through the opening in the chamber wall into the low-pressure chamber and/or vacuum chamber or to take them out of there. Deviating from these preferred embodiments it can also be provided that the maximally opened position of the closure element is already reached when the closure element still partially covers the through-opening. For reasons of completeness it is pointed out that devices according to the invention are embodied and/or can also be used as valves for blocking and/or passing liquids and/or gases.

An essential advantage of devices according to the invention using inflatable seals comprises, as already mentioned, among other things that they require only a relative simple mechanism for moving the closure elements. For example, this mechanism only needs to serve bringing the closure element entirely congruent with the through-opening and/or to perform the opposite motion. The actual sealing can then occur by inflating the elastic seal and/or its inflatable chamber, by which ultimately the closed position is achieved without the closure element for this purpose being required to perform any additional motion, e.g., in the direction towards the seat. The seat serves generally as a sealing surface of the main body or the closure element against which the seal with its sealing surface seals.

Within the course of the description of the invention a low-pressure chamber is discussed, when in this chamber after the closure of the penetrating opening a pressure can be generated which is lower than the ambient pressure. A vacuum chamber refers to this low-pressure measuring $10^{-2}$ mbar (millibar) or less, particularly $10^{-3}$ mbar and less.

Preferred embodiments provide that the seal is embodied in one piece. In this sense, it is particularly beneficial for all walls of the seal to be connected to each other in one piece. Particularly in order to achieve sufficient elasticity, the seal and/or its walls may comprise at least one elastomer, or be made completely from one or several elastomers. Suitable elastomers are e.g., fluororubber (FKM), and/or fluorocarbon-rubber, or perfluororubber (FFKM), or nitrile-rubber (NBR), or ethylene-propylene-diene-rubber (EPDM). Alternatively it is also possible that the seal and/or its walls, particularly in order to reach the required elasticity, comprise at least one elastomer or are made entirely from one or several plastomers.

BRIEF DESCRIPTION OF THE DRAWINGS

Additional details and features of preferred embodiments of the invention are explained in greater detail based on the figures. Shown are:

FIG. 3 is a longitudinal cross-section according to the section line 3-3 of FIG. 2;

FIG. 4 is a longitudinal cross-section similar to FIG. 3, with here the closure element being in the maximally opened state, though;

FIG. 5 is the detail as indicated from FIG. 3;

FIG. 6 is a cross-section through FIG. 5 in an orthogonally extending level along the section line 6-6;

FIG. 7 is a cross-section through FIG. 5 in an orthogonal sectional level along the section line 7-7;

FIG. 8 is a cross-section through FIG. 5 in an orthogonal sectional level along the section line 8-8;

DETAILED DESCRIPTION OF THE PREFERRED EMBODIMENTS

Figure 1:
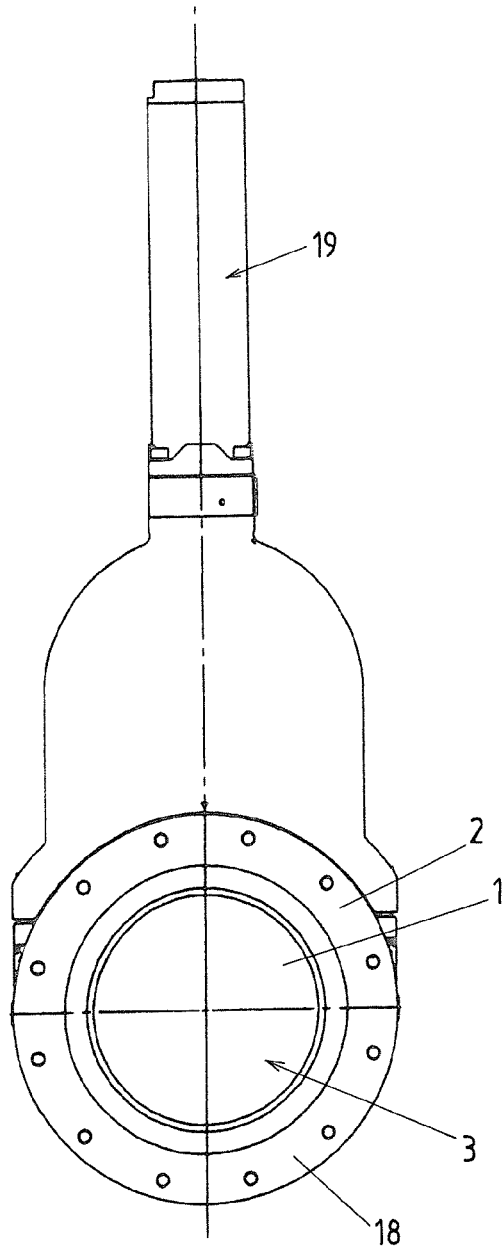
FIG. 1 is a front view of an exemplary embodiment of a device according to the invention.

The first exemplary embodiment according to the invention is explained based on FIGS. 1 through 11. FIG. 1 shows a view from the front to the device embodied according to the invention. The exemplary embodiment shown represents a variant in which the device first is produced as a separate component and then is mounted with an assembly flange 18 to the chamber wall of the low-pressure and/or vacuum chamber, not shown here. This assembly occurs in the form such that here the through-opening 3 is made congruent with the opening in the chamber wall of the low-pressure and/or vacuum chamber so that by opening and closing the through-opening 3 via the closure element 1 the opening in the chamber wall of the low-pressure and/or vacuum chamber is also opened and/or closed. Alternatively, of course other embodiments are possible in which the main body 2 is integrated in the chamber wall of a low-pressure and/or vacuum chamber such that the through-opening 3 per se represents the opening in the chamber wall and/or is congruent therewith.

Figure 2:
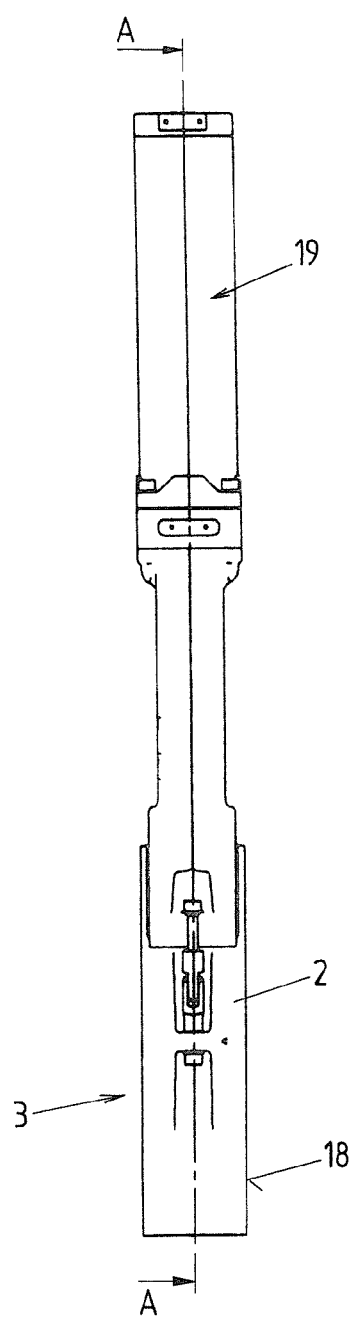
FIG. 2 is a side view according to FIG. 1.

In FIGS. 1, 2, and 3 the closure element 1 is in the closed position, in which together with the elastic seal 5, not shown in these figures, it completely seals the through-opening 3. FIG. 4 shows a cross-section similar to FIG. 3, in which the closure element 1 is brought into the maximally opened position. In this position the closure element 1 is no longer congruent at all with the through-opening 3 surrounded by the seat 4. In other words, in this maximally opened position there is no longer any congruence between the closure element 1 and the through-opening 3, which in the maximally opened position are arranged generally without any overlap in reference to each other. This way, the through-opening 3 is available with its entire opening cross-section in order to allow work pieces to be processed and/or fluids to be introduced via the through-opening 3 into the low-pressure and/or vacuum chamber or to be removed therefrom.

Figure 10:
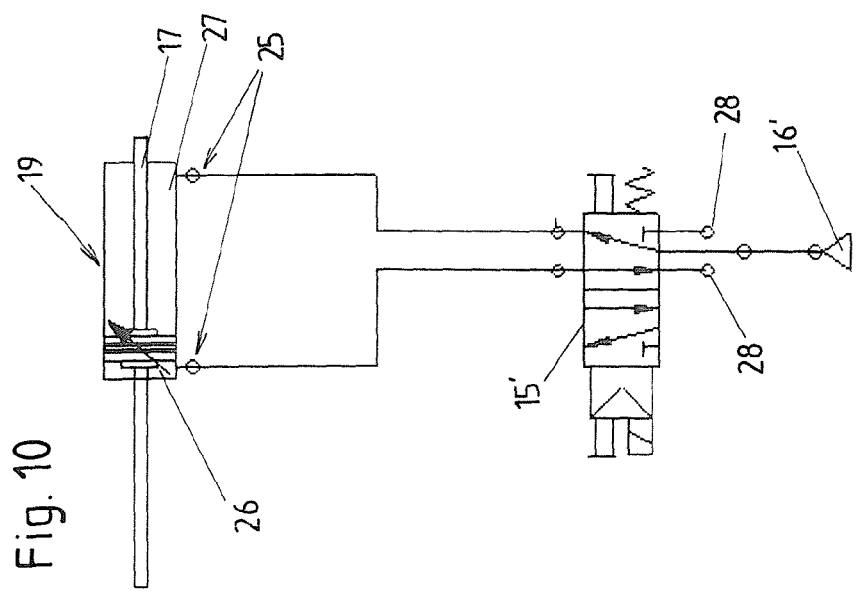
FIG. 10 is a schematic diagram to operate the linear drive for the closure element.
Figure 9:
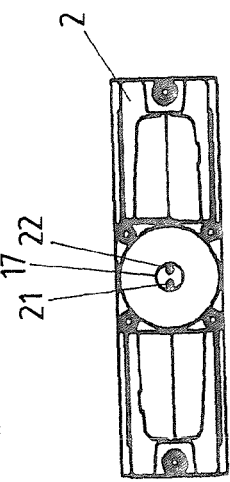
FIG. 9 is a cross-section along the section line F-F of FIG. 3.

In the exemplary embodiment shown the closure element 1 exclusively performs a linear motion between the positions shown in FIGS. 3 and 4. For this purpose, the closure element 1 is supported at an actuator arm 17, which is embodied like a piston rod. The piston 20 rests on the actuator arm 17, which is guided displaceably in the cylinder of the linear drive 19. In order to move the actuator arm 17 and thus the closure element 1 of this exemplary embodiment, depending on the desired direction of motion, impinge the cylinder chambers 26 or 27 with pressure. For this purpose, they are connected to respective pressure lines 25. The linear drive 19 of this exemplary embodiment may represent either a pneumatic or a hydraulic drive. An example of a pneumatic and/or hydraulic diagram for this linear drive 19 is shown in FIG. 10. In a pressure source 16' a fluid, thus at least one gas or at least one liquid are stored under pressure. Via the switching valve 15', depending on the direction the actuator arm 17 and thus the closure element 1 shall be moved, the cylinder chambers 26 or 27 are impinged with pressure. The respectively other chamber is connected by a respective setting of the switching valve 15' to one of the pressure releases 28 so that, when the cylinder chamber 26 or 27 is impinged with pressure, the fluid can be drained from the respectively other cylinder chamber 26 or 27. This way, as known per se, the closure element 1 together with the actuator arm 17 can be moved back and forth between the two end positions shown in FIGS. 3 and 4.

Deviating from the embodiment shown, of course any other known linear drive may be used instead of the concretely shown linear drive 19. The invention can also be used independent therefrom in closure devices in which the closure element 1, perhaps together with a respective actuator arm 17, performs a pure pivotal motion or an overlap of a linear and a pivotal motion and/or be supported in an appropriately shiftable and/or pivotal fashion.

In the exemplary embodiment shown the closure element 1 is embodied in the form of a closure plate and/or a closure shield. Of course, other embodiments are also possible, here.

A particularly beneficial feature of the embodiment according to the invention shown in FIGS. 1 through 11 comprises that the fluid ducts 21 and 22 required as fluid supply and drainage for the elastic seal 5 described in the following extend at least sectionally within the actuator arm 17. This way the problem of the fluid supply and drainage to and from the elastic seal 5 is attained in a particularly simple fashion.

The elastic seal 5 per se is not shown in the illustrations according to FIGS. 3 and 4. In order to indicate the position the annularly closed progression of the elastic seal 5 of this exemplary embodiment is drawn in dot-dash lines in FIGS. 3 and 4. In order to explain the embodiment of the elastic seal 5 according to the invention in this exemplary embodiment and its supply and drainage lines reference is made particularly to FIGS. 5 through 8. FIG. 5 shows the indicated detail from FIG. 3 in an enlarged fashion. FIGS. 6 through 8 each show cross-sectional planes, which are aligned orthogonally and/or normally in reference to the drawing plane in FIG. 5. In these sectional planes cross-sections are shown through the elastic seal 5 embodied according to the invention. In FIG. 6 this cross-section is located in the area of the section line 6-6 of FIG. 5. Accordingly it represents a section through the fluid channel 21 leading to the inflatable chamber 6. FIG. 7 shows the section along the sectional line 7-7 of FIG. 5, thus in the area between the fluid channels 21 and 22. In this section level, no fluid inlet or fluid outlet openings 10 or 11 are provided. FIG. 8 shows the respective cross-section along the section line 8-8 of FIG. 5, thus through the second fluid channel 22 which leads to the safety chambers 7 and/or the fluid outlet openings 11.

In the exemplary embodiment shown two seals 5 are provided in the closure element 1, which respectively seal the closure element 1 from two opposite seats 4 of the main body 2. This way, it is achieved in a simple manner that during the inflation process of the inflatable chambers 6 the closure element 1 remains centered along the longitudinal central axis of the device and/or the actuator arm 17. Furthermore, a dual sealing is achieved. This only represents a preferred embodiment, as explained in the following based on additional exemplary embodiments. It shall further be pointed out that in the sectional illustrations according to FIGS. 6 and 8 the seals 5 are each shown in a non-inflated state. In this state they are not sealing the closure element 1 against the seat 4. Accordingly, the sealing surfaces 13 are not in contact with the seats 4. However, FIG. 7 shows the seals 5 with an inflated chamber 6, thus in a state in which the sealing surfaces 13 of the respective seal 5 are pressed against the seats 4 and thus the seals seal the closure element 1 against the seats 4 and/or the main body 2, which is equivalent to the closed position.

As indicated in FIGS. 3 and 4, the elastic seals 5 shown here represent circulatory closed seals. These seals are embodied in a tubular fashion in the exemplary embodiment shown. The inflatable chamber 6 and the safety chambers 7 are also embodied circumferential and each self-contained, except for the fluid opening(s) 10 and/or the fluid outlet(s) 11. Each of the seals 5 shown comprise a frontal wall 12 with the sealing surface 13 to contact the seat 4 of the main body 2. Further, each seal 5 comprises a rear wall 14 to contact the closure element 1 and at least one intermediate wall 8 each between the safety chamber 7 and the inflatable chamber 6. In the exemplary embodiments shown each of the seals 5 is fixated with the rear wall 14 at the closure element 1. The elastic seals 5 are thus fastened at the closure element 1. This is not mandatory, though. Embodiments according to the invention are also possible, in which the seal 5 is fixated accordingly at the seat or seats 4 of the main body 2 and during the inflation of the seal and/or its inflatable chamber 6 the sealing surface 13 of the seat 5 is pressed against an appropriate seat of the closure element 1.

The intermediate walls 8 separating the inflatable chamber 6 from the safety chamber 7 form a type of predetermined breaking point such that, when leaks occur in the inflatable chamber 6, they happen in one of the intermediate walls 8 so that fluid present under pressure in the inflatable chamber 6 exclusively flows into one of the safety chambers 7 and cannot reach the vacuum and/or low-pressure chamber, not shown here. In order to achieve this, it is provided in the preferred as well as the shown exemplary embodiment that the inflatable chamber, preferably surrounded exclusively and/or entirely by the frontal wall 12 and the rear wall 14 and at least one intermediate wall 8 and the intermediate wall 8 is embodied at least sectionally weaker and/or thinner than the frontal wall 12 and the rear wall 14.

Figure 11:
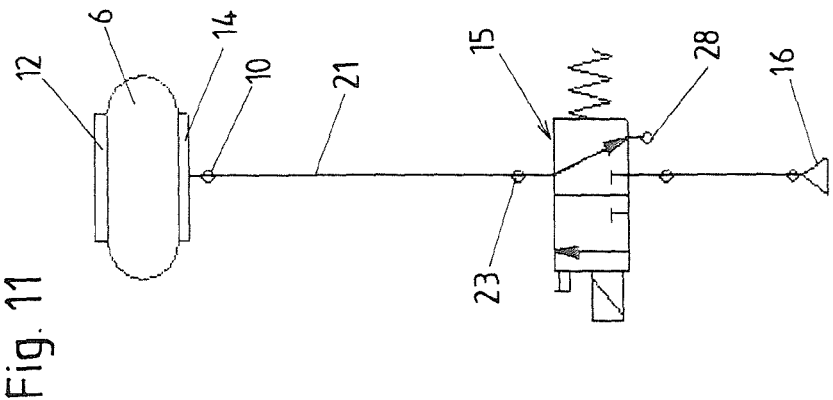
FIG. 11 is a schematic diagram for inflating the inflatable chamber of the elastic seal.

In order to allow inflating the inflatable chamber 6 and thus the seal 5 and pressing the sealing surface 13 against the seat 4, as shown for example schematically in FIG. 11, the inflatable chamber 6 is connected to fluids via a switching valve 15 connected to a pressure source 16. The concrete embodiment in the area of the seal 5 is particularly clearly shown in FIG. 6 for this exemplary embodiment. The fluid connection mentioned is achieved in this exemplary embodiment by the inflatable chamber 6 being connected via the fluid entry opening 10 to the fluid channel 21. At the other end of the fluid channel 21 a connection 23 is located, as shown at least schematically in FIG. 11, to the switching valve 15 and thus leading to the pressure source 16. In the switching state according to FIG. 11 the inflatable chamber 6 is connected to the pressure outlet 28. In this position of the switching valve 15 therefore drainage of the pressurized fluid occurs out of the inflatable chamber 6. The fluid entry opening 10 therefore actually represents also a fluid outlet opening. When the switching valve is set in the other switching position, not shown here, the inflatable chamber 6 is connected to the pressure source 16. In this position the pressurized fluid, regardless if representing at least one gas or at least one liquid, is pressed into the inflatable chamber 6 so that it expands until the sealing surface 13 is pressed with the respective pressure against the seat 4.

In the event a leak occurs in one of the intermediate walls 8 in this state with increased pressure in the inflatable chamber 6, the pressurized fluid flows into the respective safety chamber 7. In the exemplary embodiment shown both safety chambers 7 are connected via respective fluid outlet openings 11 to the second fluid channel 22. This (channel) comprises at the other side an open end 24, through which in the exemplary embodiment shown the fluid flowing out of the inflatable chamber 6 can escape to the atmosphere. It is therefore beneficially provided that at least one safety chamber 7 is fluidically connected via a fluid outlet opening 11 to an exterior space, which is located outside the low-pressure and/or vacuum chamber. Thus atmospheric pressure is given in the exemplary embodiment shown at the open end 24 and thus also in the safety chambers 7. Of course it is also possible to connect the second fluid channel 22 and/or the safety chambers 7 to a pressurized and/or low-pressure container in which a different pressure is given. It is even possible for respectively large safety chambers 7 to embody them in an entirely closed fashion, thus without any fluid outlet opening 11, when they are sized suitably to accept an appropriate amount of fluid from the inflatable chamber 6.

Figure 13:
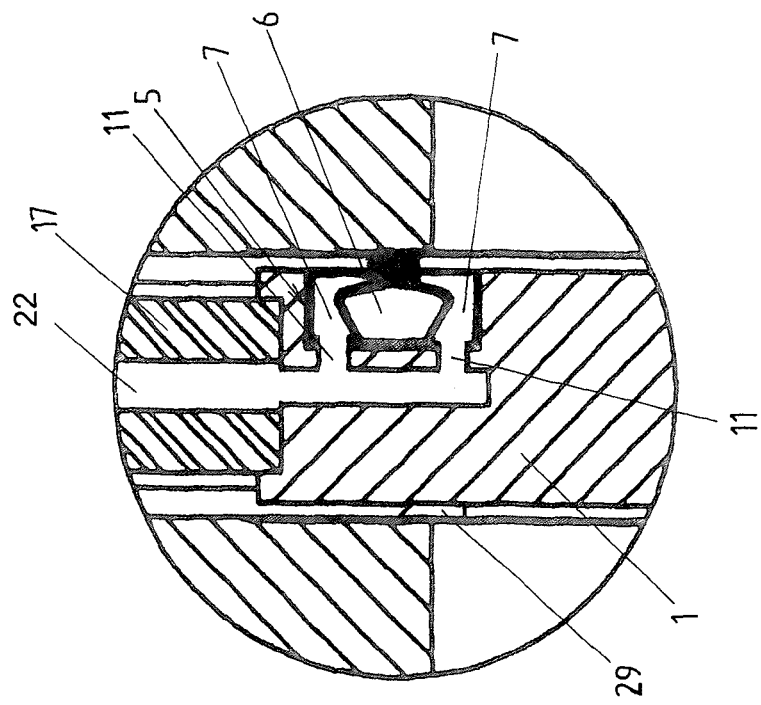
FIGS. 12 and 13 are detailed illustrations of a second exemplary embodiment of the invention in cross-sections similar to FIGS. 6 and 8, and FIGS. 14 through 18 are cross-sections and/or longitudinal cross-sections of alternative embodiments according to elastic seals embodied according to the invention.
Figure 12:
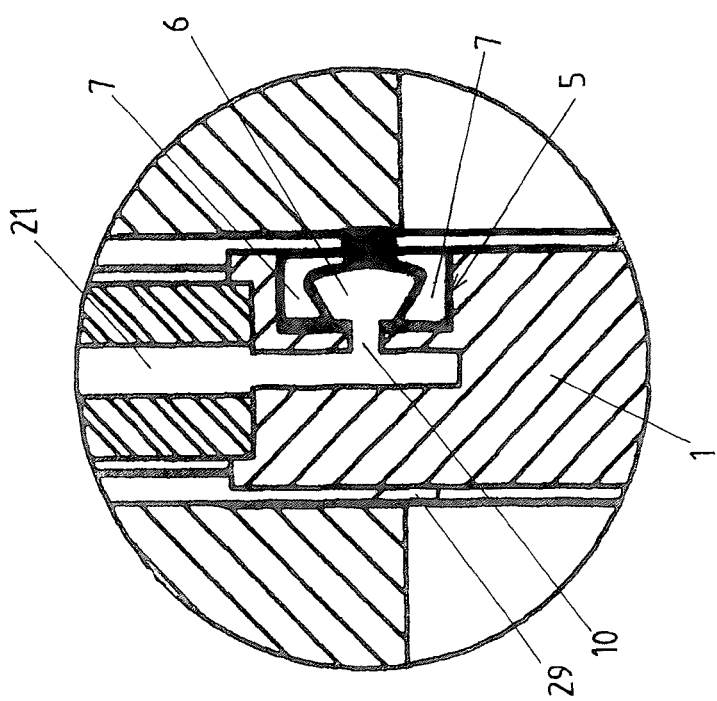

While in the first exemplary embodiment two inflatable seals 5 are provided in the closure element 1, operating in opposite directions, FIGS. 12 and 13 show a second exemplary embodiment according to the invention in which only one annular, inflatable, self-contained seal 5 is provided in the closure element 1. FIGS. 12 and 13 show only details similar to FIGS. 6 and 8, in which this difference is best discernible. All other details of the second exemplary embodiment of the device according to the invention, not shown here, may be embodied similar to the first exemplary embodiment.

In this exemplary embodiment supports 29 are provided in order to allow appropriately supporting the closure element 1 on the other side. When inflating the inflatable chamber 6 of the seal 5 the closure element 1 is supported on these supports and/or projections 29 of the main body 2 of the device so that also by pressing the sealing surfaces 13 the desired sealing effect is achieved via the seal 5 between the main body 2 and the closure element 1. The supports 29 may show very different forms and embodiments. Using appropriately massively embodied supports of the actuator arm 17 it may even be provided to waive the support 29 when the actuator arm 17 is strong enough to apply the counter-force during the inflation of the seal 5. The supply and drainage of the fluid to and fro the inflatable chamber 6 as well as, when needed, the drainage of fluid from the safety chambers 7 occurs similar to the first exemplary embodiment and thus requires no repeated explanation. Overall, the entire seal including its connections can be embodied similar to the first exemplary embodiment.

Figure 14:
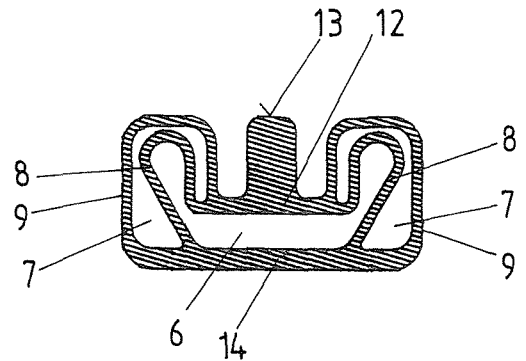
Figure 15:
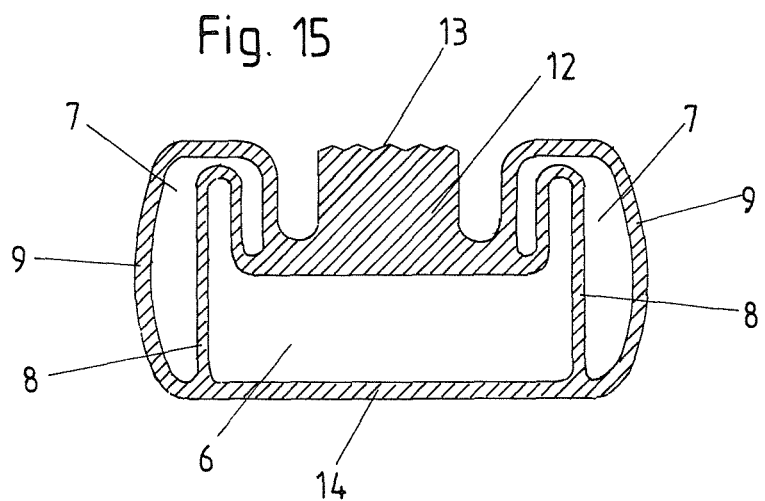

FIGS. 14 and 15 show different alternative embodiments of seals 5 with inflatable chambers 6 and safety chambers 7. The connections and/or fluid inlet and fluid outlet openings 10 and 11, not shown in these illustrations, may also be embodied similar to the ones in the first exemplary embodiment. In all cases it is beneficial here when the intermediate wall 8 between the respectively inflatable chamber 6 and the safety chambers 7 is the weakest and/or thinnest wall and/or represents a respective predetermined breakage point. This is particularly important when, as can be deduced from FIGS. 14 and 15, the walls 8 and 9 during each inflation process as well as during the compression of the inflatable chamber 6 performing a bending and/or rolling motion.

Figure 16:
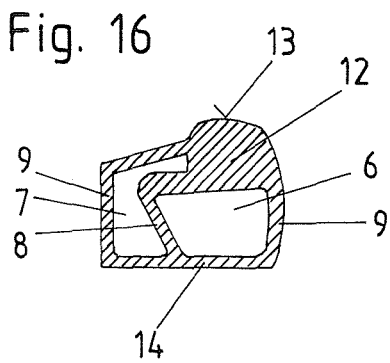

While in all previously discussed exemplary embodiments the safety chambers 7 are always arranged symmetrically at both sides of the inflatable chamber 6, FIG. 16 shows a variant in which only one safety chamber 7 is arranged at one side of the inflatable chamber 6. In this exemplary embodiment the right lateral exterior wall 9, together with the rear wall 14 and the frontal wall 12, is embodied considerably more stable than the intermediate wall 8 such that here too in case of a leakage it will occur in the intermediate wall 8 and thus it is ensured that the pressurized fluid flows out of the inflatable chamber 6 into the safety chamber 7 and not into the low-pressure and/or vacuum chamber. The fluid inlet and outlet openings 10 and 11 in FIG. 16 may be embodied like the ones in the other exemplary embodiments.

Figure 17:
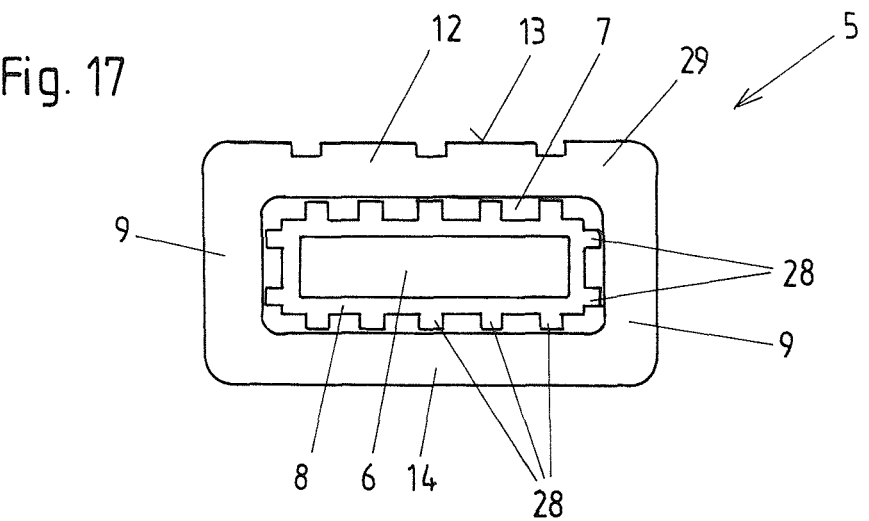
Figure 18:
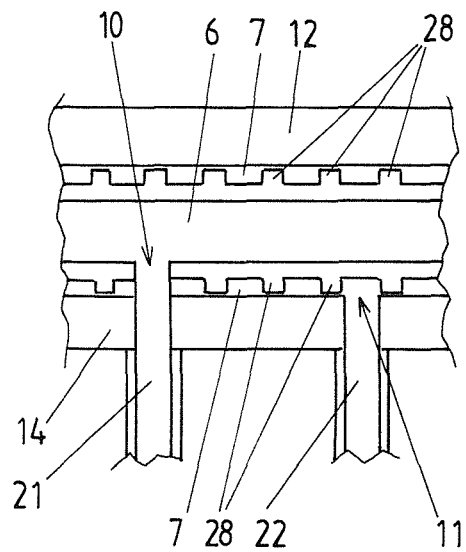

FIG. 17 shows a cross-section and FIG. 18 a longitudinal section of another embodiment of the seal 5 according to the invention for a device according to the invention. In this variant the inflatable chamber is arranged completely inside a hollow chamber of the safety chamber 7. Here, it is provided that the intermediate wall 8, between the inflatable chamber 6 and the safety chamber 7, completely surrounds the inflatable chamber 6 and/or the hollow space of the inflatable chamber 6. The inflatable chamber 6 is here surrounded by a tubular embodied intermediate wall 8 and arranged completely inside a hollow space of the safety chamber 7. Thus, it may also be called a tube-in-tube arrangement with the intermediate wall 8 surrounding the inflatable chamber 6 being embodied as an inner tube and the exterior wall 29, which preferably forms the lateral exterior walls 9 and the frontal wall 12 and the rear wall 14, surrounding the safety chamber 7 being embodied as the outer tube, and the inner tube, preferably entirely, is arranged inside said outer tube. In order to prevent the intermediate wall 8 from adhering to the exterior wall 29 the intermediate wall 8 may be provided with a structuring 28 ensuring a spacing at its exterior, as shown here, and/or the outer wall 29 at its interior. The structuring 28 may here represent for example burling and/or a grid structure and/or bars. The sealing surface 13 is located at the exterior wall 29 of the safety chamber 7 of this seal 5, by which the seal 5 during the inflation process of the inflatable chamber 6 is pressed against the seat 4 of the main body 2. In the longitudinal section according to FIG. 18 the fluid inlet opening 10 is discernible, which simultaneously acts as the fluid outlet opening 11 for the inflatable chamber 6 and the fluid outlet opening 11 of the safety chamber 7 arranged next to it as well as the fluid channels 21, 22 allocated thereto.

All seals 5 shown individually in FIGS. 14 through 18 may be integrated in the exemplary embodiment of devices according to the invention shown in FIGS. 1 through 12 and/or replace the seals 5 shown there. Of course, installations according to the invention may also be realized in embodiments different from the ones shown.

Finally it is also pointed out that not only installations embodied according to the invention per se but also low-pressure and/or vacuum chambers with at least one device according to the invention, perhaps embodied integrated, may be considered the objective of the invention. In order to allow pressing the seals and/or their sealing surfaces 13 appropriately tightly against the seats 4 it may be provided that the inflatable chambers 6 are impinged with a pressure of up to 10 bar. Here, the stroke performed by the sealing surface 13 and/or the seal 5 may range from 1 mm to 5 mm, preferably from 1 mm to 3 mm. An advantage of the invention also comprises that, instead of the L-shaped path of the closure element required in many closure devices for low-pressure or vacuum chambers, it only requires a linear displacement or a respective pivoting of the closure element.

LEGEND FOR THE REFERENCE CHARACTERS 1 closure element
2 main body
3 through-opening
4 seat
5 seal
6 inflatable chamber
7 safety chamber
8 intermediate wall
9 lateral exterior wall
10 fluid inlet opening
11 fluid outlet opening
12 fronts; wall
13 sealing surface
14 rear wall
15, 15' switching valve
16, 16' pressure source
17 actuator arm
18 assembly flange
19 linear drive
20 piston
21 first fluid channel
22 second fluid channel
23 connection
24 open end
25 pressure line
26 first cylinder chamber
27 second cylinder chamber
28 structuring
29 exterior wall

The invention claimed is:

1. A device for closing an opening in a chamber wall of a low-pressure or vacuum chamber, comprising
    at least one movably supported closure element,
    at least one main body with a through-opening and at least one seat, which surrounds the through-opening, wherein the through-opening can be made congruent or is congruent with the opening in the chamber wall,
    at least one open position of the closure element, in which the through-opening is released by the closure element and at least one closed position of the closure element, in which the through-opening is completely closed by use of the closure element,
    at least one elastic seal with at least one inflated inner chamber, with the seal in the closed position being arranged between the closure element and the seat sealing the closure element against the seat, and
    the elastic seal in addition to the inflated inner chamber comprises at least one outer surrounding chamber that receives and captures fluid from the inflated inner chamber in case of a leak in the inflated inner chamber, the at least one outer surrounding chamber is closed or directs the fluid to an exterior space located outside of the low-pressure or vacuum chamber through a fluid channel connected to a fluid outlet opening in the at least one outer surrounding chamber, the fluid channel is formed at least in sections as a part of the at least one closure element.

2. A device according to claim 1, wherein the inflated inner chamber is separated from the at least one outer surrounding chamber by at least one intermediate wall of the seal.

3. A device according to claim 2, wherein the inflated inner chamber is surrounded by the intermediate wall and other walls of the seal, and a cross-section of the intermediate wall is thinner than the other walls.

4. A device according to claim 2, wherein the at least one outer surrounding chamber is limited by the intermediate wall and a lateral exterior wall of the seal.

5. A device according to claim 1, wherein the at least one outer surrounding chamber is arranged adjacent to the inflated inner chamber.

6. A device according to claim 1, wherein the seal is embodied as a circumferential, self-contained seal and the inflated inner chamber and the at least one outer surrounding chamber, except for at least one of a fluid inlet opening or at least one fluid outlet opening, are also embodied circumferential and each self-contained.

7. A device according to claim 1, wherein the seal comprises a frontal wall with a sealing surface to contact the seat of the main body and a rear wall to contact the closure element and at least one intermediate wall between at least one outer surrounding chamber and the inflated inner chamber.

8. A device according to claim 7, wherein the inflated inner chamber is surrounded by the frontal wall and the rear wall and the at least one intermediate wall, and a cross-section of the intermediate wall is thinner than the frontal wall and the rear wall.

9. A device according to claim 7, wherein the rear wall of the seal is fixed at the closure element.

10. A device according to claim 1, wherein the seal is embodied in one piece.

11. A device according to claim 7, wherein all of the walls of the seal are connected to each other in one piece.

12. A device according to claim 1, wherein the outer surrounding chamber completely surrounds the inflated inner chamber.

13. A device according to claim 1, wherein the fluid channel is at least in sections part of an actuator arm that is connected to the closure element.

* * * * *